March 17, 1959     W. G. MYERS     2,877,543
MACHINE FOR ASSEMBLING RESILIENT BUSHINGS
Filed May 11, 1954     2 Sheets-Sheet 1
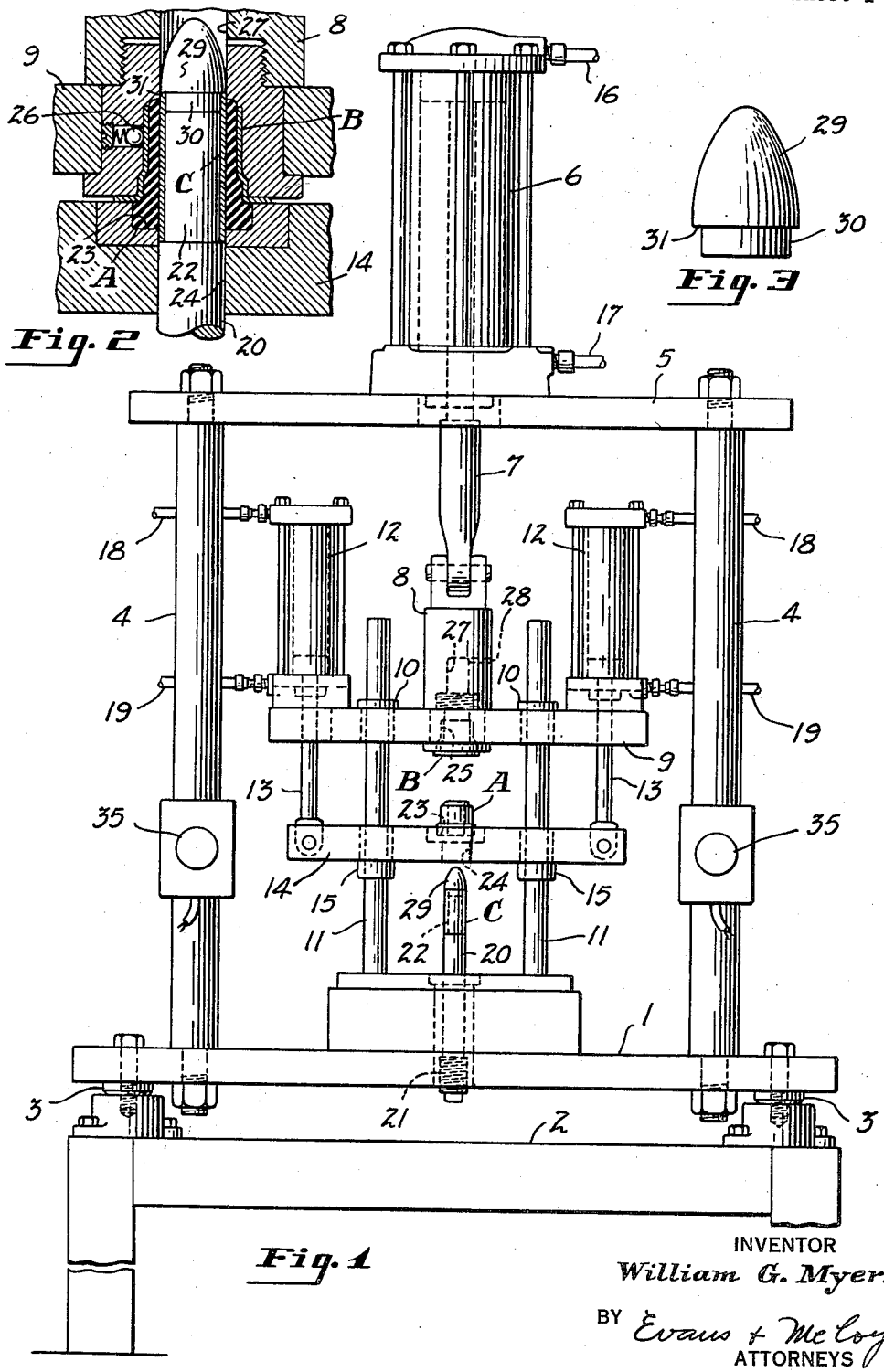
INVENTOR
William G. Myers
BY Evans & McCoy
ATTORNEYS March 17, 1959  W. G. MYERS  2,877,543
MACHINE FOR ASSEMBLING RESILIENT BUSHINGS
Filed May 11, 1954  2 Sheets-Sheet 2

INVENTOR
William G. Myers
BY Evans & McCoy
ATTORNEYS

United States Patent Office 2,877,543
Patented Mar. 17, 1959

2,877,543

MACHINE FOR ASSEMBLING RESILIENT BUSHINGS

William G. Myers, Kewanna, Ind.

Application May 11, 1954, Serial No. 428,982

3 Claims. (Cl. 29—235)

This invention relates to machines for assembling resilient bushings of the type in which a tubular elastic rubber insert is confined under radial pressure between an outer rigid sleeve and an inner rigid core.

The machine of the present invention is in the form of a press having a reciprocating head provided with a socket in which the outer sleeve of a bushing may be secured, a stationary support upon which a core may be mounted, and an intermediate crosshead that is provided with means for supporting a tubular insert between a sleeve socket and core support in axial alinement with a sleeve in the sleeve socket and a core on the core support. The crosshead is provided with an opening coaxial with its insert positioning socket through which a core may pass and is movable relative to the head to press an insert into a sleeve mounted in the socket of the head. The head and crosshead are movable simultaneously toward the core support to cause a core to pass through the crosshead opening and into an insert within the sleeve in the socket of the head.

The press is preferably a vertical press in which the head is reciprocated vertically by means of a fluid pressure cylinder and in which the crosshead is also provided with fluid pressure actuating means.

The invention has for an object to provide a machine in which a complete assembling operation is performed by a single stroke of the press head.

Another object of the invention is to provide a bushing assembly machine in which a rubber insert is rapidly forced into the outer sleeve and the core is rapidly forced into the insert positioned within the sleeve during the advancing stroke of a press head.

A further object is to provide a machine in which the sleeve, insert and core supporting parts are conveniently positioned for the placing of these parts into the machine by the operator.

Other objects of the invention are to provide a machine which is of simple construction, relatively inexpensive and which occupies a minimum of floor space.

Reference should be had to the accompanying drawings forming a part of this specification in which:

Figure 1 is a front elevation of a machine embodying the invention, showing the bushing parts positioned in the machine for assembly on the down stroke of the press head;

Fig. 2 is a fragmentary section showing the press head at the lower end of the stroke and an assembled bushing on the core supporting plunger;

Fig. 3 is a side elevation of a pilot that is adapted to be mounted in the upper end of a tubular core to facilitate entry of the core into the rubber insert;

Figure 4:
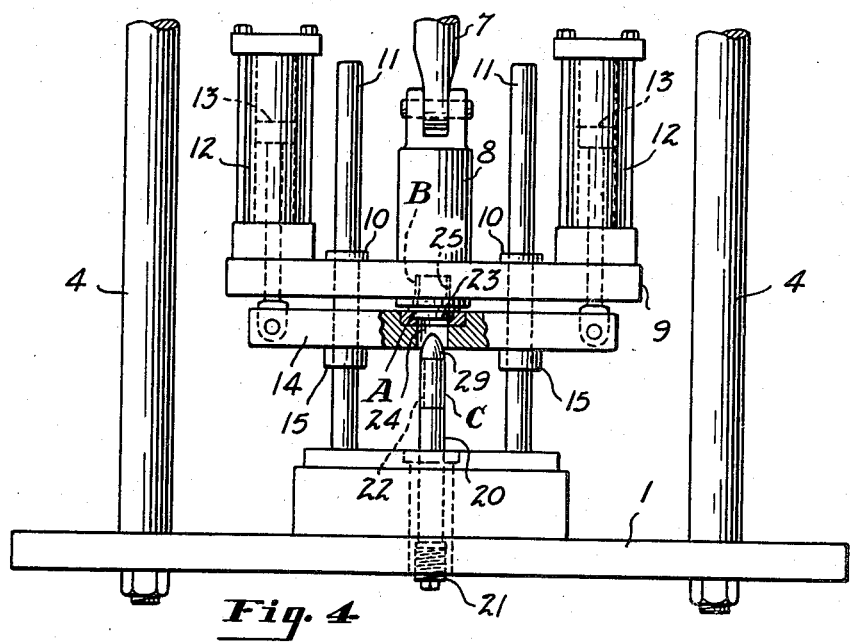
Fig. 4 is a fragmentary front elevation showing the press head in an intermediate position where the crosshead is against the bottom thereof, clamping the insert in the outer sleeve of the bushing that is positioned in the socket of he head.
Figure 5:
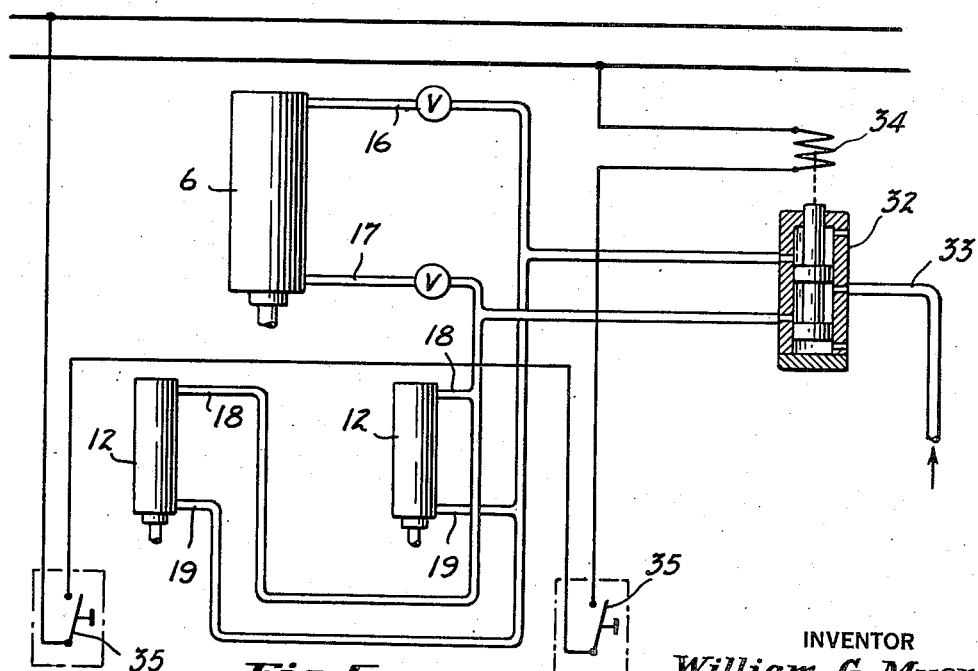
Fig. 5 is a diagrammatic view showing the control of the fluid pressure actuating means.

The machine of the present invention is designed to assemble a resilient bushing, which as shown in Figs. 1 and 2, comprises a tubular elastic rubber insert A that is retained under radial compression between an outer rigid sleeve B and an inner rigid core C. As shown in Fig. 1, the external diameter of the insert A is normally greater than the internal diameter of the sleeve B and the internal diameter of the insert A is normally less than the external diameter of the core C. In the assembling operation the external diameter of the insert is reduced and its internal diameter increased. By pressure applied during the assembling operation and when confined between the sleeve B and core C, the insert A is axially elongated and retained under radial compression between the sleeve and core.

The machine has a base member 1 mounted at a convenient height on a stand 2, vibration dampening cushions 2 being provided between the base 1 and the stand 2. Vertical posts 4 attached to the base 1 support a top member 5 upon which is mounted an operating cylinder 6 that has a piston 7 extending downwardly and attached to a head 8 that is adapted to be reciprocated by the piston. The head 8 has a horizontal crossbeam 9 attached thereto adjacent its lower end and the crossbeam 9 is provided with collars 10 that slide on vertical guide posts 11 mounted on the base 1. The crossbeam 9 supports a pair of vertically disposed cylinders 12, one on each side of the head 8 and the cylinders 12 have downwardly extending pistons 13 that are attached at their lower ends to a crosshead 14 that has collars 15 that are slidable on the guide posts 11.

The main operating cylinder 6 has pressure lines 16 and 17 through which may be supplied to the upper and lower ends thereof to force the piston 7 downwardly or hold the piston 7 in its uppermost position. The cylinders 12 have pressure lines 18 and 19 connected to the upper and lower ends thereof to hold the crosshead 14 in its lowermost position, or to draw the crosshead 14 upwardly against the lower end of the head 8. A vertical core carrying plunger 20 is mounted in fixed position on the base 1 centrally thereof and has a threaded connection 21 with the base 1 so that it can be adjusted vertically. The plunger 20 has a core supporting portion 22 at its upper end which is of reduced diameter and upon which a tubular core C will slidably fit. The crosshead 14 is provided on its upper face with an insert positioning socket 23 that is of a size to receive an end of the insert and support the insert in an upright position in axial alinement with the plunger 20. Centrally of the insert positioning socket 23 the crosshead 14 is provided with an opening 24 of a size to permit passage of a core C and the core supporting plunger 20.

At its lower end the head 8 is provided with a sleeve receiving socket 25 that is axially alined with the socket 23 and core supporting plunger 20. The socket 25 is provided with a sleeve engaging detent 26 for retaining a sleeve in a socket and has a bore 27 above the sleeve receiving portion of the socket that is provided with a vent aperture 28 to permit escape of air during the assembling operation.

To facilitate the entry of the core C into the insert A after the insert is placed within the sleeve B, a tapered pilot 29 may be provided which has a reduced lower end portion 30 that is adapted to fit in the upper end of a tubular core C. At the upper end of the core engaging portion 30 the pilot 29 is provided with a circumferential shoulder 31 that overlies the upper end of the tubular core to prevent engagement of the end of the core with the rubber insert during the assembling operation.

Pressure is normally supplied to the lower end of the cylinder 6 and to the upper ends of the cylinders 12 to hold the head 8 in its upermost position and the crosshead 14 in its lowermost position. With the head and crosshead so positioned, there is space enough between the lower end of the head 8 and the top of the crosshead 14 to permit the placing of a sleeve B in the socket 25 and an insert A in the socket 23. The crosshead 14 in its lowermost position is adjacent the upper end of the core supporting plunger 20 and a core C with a pilot 29 mounted therein can be readily passed through the opening 24 onto the upper end portion 22 of the plunger 20, the opening 24 serving to guide the core into engagement with the plunger.

The supply of fluid, preferably air under pressure, to the cylinders 6 and 12 is controlled by a valve 32 that is normally positioned to connect a pressure line 33 to the lines 17 and 18 connected to the lower end of the cylinders 6 and the upper ends of the cylinders 12 to hold the head 8 in its uppermost position and the crosshead in its lowermost position for convenient placement of the bushing parts in the machine. The valve 32 is actuated by suitable means such as a solenoid 34 to reverse the pressure in the cylinders 6 and 12 to move the crosshead 14 upwardly into engagement with the head 8 and to move the head 8 and crosshead 14 downwardly to the position shown in Fig. 2 to complete the assembling operation. During this operation the rate of movement of the pistons 7 and 13 is controlled by the air trapped between the pistons and the vent in the valve 32 and, within the range of pressures adequate for the press operation, the relative speeds of the pistons 7 and 13 is such that the insert A is entered into the sleeve B before the insert A engages the pilot 29. The solenoid 34 may be controlled by means of palm switches 35 on the posts 4, the switches 35 being in series so that the operator is required to use both hands to hold the switches closed during the assembling operation.

Upon actuation of the valve 32 by the solenoid 34 pressure is simultaneously admitted to the upper end of the main cylinder 6 and to the lower ends of the auxiliary cylinder 12 to move the head 8 and crosshead 14 downwardly and to simultaneously move the crosshead 14 upwardly to force the insert A thereon into a sleeve B in the socket 25 of the head. The upward stroke of the crosshead 14 is completed during the downward movement of the head 8 so that the insert A is forced into the sleeve 25 and the insert A and sleeve B are clamped to the socket 25 when the insert is brought into engagement with the pilot 29. Downward movement of the head 8 is sufficient to enter the core C into the insert A as shown in Fig. 2 and, when the switches 35 are released, the head 8 and crosshead 14 are returned to their normal positions shown in Fig. 1, lifting the assembled bushing off the plunger 20. The assembled bushing is then removed and another insert A, sleeve B and core C are positioned in the machine as shown in Fig. 1.

It is to be understood that in accordance with the provisions of the patent statutes, variations and modifications of the specific devices herein shown and described may be made without departing from the spirit of invention.

What I claim is:

1. A machine for assembling resilient bushings that have a tubular elastic rubber insert retained under radial compression between an outer rigid sleeve and an inner rigid core comprising a head mounted for vertical linear movement and having a downwardly opening vertically disposed sleeve receiving socket, a stationary vertically disposed core inserting plunger beneath said socket in axial alinement therewith, said plunger having an upper end portion of reduced diameter to receive a tubular core, a crosshead supported on said head for vertical movement with respect thereto, said crosshead being below said socket and having an insert positioning socket in its upper face for supporting an insert in vertical alinement with said sleeve socket, said crosshead having a plunger receiving opening centrally of said core positioning socket, fluid pressure means for actuating said head, fluid pressure means operatively connected to said head and crosshead for moving said crosshead toward and away from said head, and means for controlling said fluid pressure means to move the crosshead toward said head to press an insert into a sleeve in said pocket and then to move the head and crosshead downwardly with the insert and sleeve clamped between them to cause said plunger to enter said crosshead opening and a core on said plunger to enter the insert within the sleeve.

2. A machine for assembling resilient bushings that have a tubular elastic rubber insert retained under radial compression between an outer rigid sleeve and an inner rigid core comprising a frame, a head mounted for vertical movement on said frame, a vertically disposed fluid pressure cylinder mounted on the frame above said head and having a piston connected to said head, a crosshead guided for vertical movement in the frame below said head, a pair of laterally spaced vertically disposed cylinders mounted on said head and having pistons connected to said crosshead, a downwardly opening vertically disposed sleeve receiving socket in said head, an upwardly opening socket in the upper face of said crosshead for positioning an insert in axial alinement with said sleeve socket, said crosshead having an opening centrally of said insert positioning socket that is of a size to permit passage of a core therethrough, a plunger mounted in vertical position below said head in axial alinement with said sockets and said openings, said plunger having means at its upper end for supporting a core in axial alinement with said opening, means for normally supplying pressure to said cylinders to hold said head in its uppermost position and said crosshead in its lowermost position in which positions a core may be placed on said plunger and a sleeve and an insert may be placed in said sockets, and means for reversing the pressure in said cylinders to simultaneously move the head downwardly and the crosshead upwardly with respect to the head to press the insert into the sleeve and then to move the head and crosshead downwardly to force the core into the insert within the sleeve.

3. A machine for assembling resilient bushings that have a tubular elastic rubber insert retained under radial compression between an outer rigid sleeve and in inner rigid core comprising a linearly movable head provided with a sleeve receiving and supporting socket having its axis extending in the direction of its linear movement, means for supporting a core in axial alinement with said socket, means for supporting an insert between said socket and core in axial alinement with both including a pressure applying and clamping member engageable with the end of an insert remote from said socket and having an opening axially alined with said insert through which a core may pass, actuating means carried by said head and connected to said clamping member for moving said clamping member axially toward and away from said head, actuating means for said head for advancing the same from a position spaced from said core supporting means to a position where a core on said supporting means is within said socket, and means controlling said actuating means for said clamping member and said head to move said clamping member toward said head to force an insert into a sleeve in said socket and to clamp the insert and sleeve in said socket and then to advance the head and clamping member simultaneously toward said core supporting means with the sleeve and insert clamped between them to force the core into the clamped insert and sleeve.

References Cited in the file of this patent

UNITED STATES PATENTS

| | | |
|---|---|---|
| 526,597 | Whyte | Sept. 25, 1894 |
| 2,550,564 | Hutton | Apr. 24, 1951 |
| 2,660,780 | Beck | Dec. 1, 1953 |
| 2,690,001 | Cowles | Sept. 28, 1954 |

FOREIGN PATENTS

| | | |
|---|---|---|
| 661,079 | Great Britain | Nov. 14, 1951 |

UNITED STATES PATENT OFFICE
CERTIFICATE OF CORRECTION

Patent No. 2,877,543                                        March 17, 1959

William G. Myers

It is hereby certified that error appears in the above numbered patent requiring correction and that the said Letters Patent should read as corrected below.

In the grant, lines 1, 2 and 3, for "William G. Myers, of Kewanna, Indiana," read -- William G. Myers, of Kewanna, Indiana, assignor to The General Tire and Rubber Company, of Akron, Ohio, a corporation of Ohio, --; line 12, for "William G. Myers, his heirs" read -- The General Tire and Rubber Company, its successors --; in the heading to the printed specification, line 4, for "William G. Myers, Kewanna, Ind." read -- William G. Myers, Kewanna, Ind., assignor to The General Tire and Rubber Company, Akron, Ohio, a corporation of Ohio --.

Signed and sealed this 15th day of September 1959.

(SEAL)
Attest:

KARL H. AXLINE                                              ROBERT C. WATSON
Attesting Officer                                          Commissioner of Patents